United States Patent
Chin et al.

(10) Patent No.: US 8,254,978 B2
(45) Date of Patent: Aug. 28, 2012

(54) METHODS AND SYSTEMS FOR FAST POWER CONTROL (FPC) MESSAGE BROADCASTING IN WIMAX SYSTEMS

(75) Inventors: Tom Chin, San Diego, CA (US); Guangming Carl Shi, San Diego, CA (US); Kuo-Chun Lee, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 547 days.

(21) Appl. No.: 12/417,592

(22) Filed: Apr. 2, 2009

(65) Prior Publication Data
US 2010/0255871 A1    Oct. 7, 2010

(51) Int. Cl.
*H04B 7/00* (2006.01)
(52) U.S. Cl. ......... 455/522; 455/525; 455/524; 455/59; 455/61; 455/68
(58) Field of Classification Search ............ 455/522, 455/525, 524, 59, 61, 68
See application file for complete search history.

(56) References Cited

U.S. PATENT DOCUMENTS

| | | | |
|---|---|---|---|
| 6,859,446 B1 * | 2/2005 | Gopalakrishnan et al. | 370/335 |
| 6,950,632 B1 * | 9/2005 | Yun et al. | 455/69 |
| 6,980,809 B2 * | 12/2005 | Western | 455/450 |
| 7,242,953 B2 * | 7/2007 | Al-Housami et al. | 455/522 |
| 2003/0207696 A1 | 11/2003 | Willenegger et al. | |
| 2008/0220804 A1 * | 9/2008 | Cho et al. | 455/522 |
| 2008/0227476 A1 * | 9/2008 | Cho et al. | 455/522 |
| 2009/0047987 A1 * | 2/2009 | Li et al. | 455/522 |
| 2009/0097426 A1 * | 4/2009 | Yin | 370/311 |
| 2009/0170488 A1 * | 7/2009 | Becker et al. | 455/416 |
| 2009/0207762 A1 * | 8/2009 | Jalloul et al. | 370/281 |
| 2009/0219856 A1 * | 9/2009 | Richardson et al. | 370/328 |
| 2009/0305736 A1 * | 12/2009 | Omori et al. | 455/522 |
| 2010/0050204 A1 * | 2/2010 | Wang et al. | 725/31 |
| 2010/0178937 A1 * | 7/2010 | Li | 455/456.2 |
| 2010/0248728 A1 * | 9/2010 | Sun et al. | 455/450 |

FOREIGN PATENT DOCUMENTS

| WO | WO2008130156 | 10/2008 |
|---|---|---|
| WO | WO2009013810 | 1/2009 |

OTHER PUBLICATIONS

International Search Report and Written Opinion—PCT/US2010/029286, International Search Authority—European Patent Office—Aug. 11, 2010.

* cited by examiner

*Primary Examiner* — Linh Nguyen
(74) *Attorney, Agent, or Firm* — Tyler Overall (57) ABSTRACT

Methods and systems or broadcasting the fast power control message in wireless communications systems are provided. In certain embodiments, the methods and systems can include receiving Carrier to Interference-plus-Noise Ratio (CINR) values from multiple mobile stations, determining a power adjustment value for each mobile station based on the CINR values, grouping the mobile stations based at least on the CINR values, and transmitting a fast power control message for each group with a different number of repetitions.

20 Claims, 9 Drawing Sheets

| Group Name | Number of Repetitions |
|---|---|
| $S_1$ | 1 |
| $S_2$ | 2 |
| $S_3$ | 4 |
| $S_4$ | 6 |

FIG. 6

| Initial Groups | Merged Groups | Merges | Gain or Saving | |
|---|---|---|---|---|
| {1,2} | {2} | 1->2 | $a - b*n_1$ | (i) |
| {2,3} | {3} | 2->3 | $2*a - 2*b*n_2$ | (ii) |
| {3,4} | {4} | 3->4 | $4*a - 2*b*n_3$ | (iii) |
| {1,3} | {3} | 1->3 | $a - 3*b*n_1$ | (iv) |
| {1,4} | {4} | 1->4 | $a - 5*b*n_1$ | (v) |
| {2,4} | {4} | 2->4 | $2*a - 4*b*n_2$ | (vi) |
| {1,2,3} | {1,3} | 2->3 | (ii) | |
| | {2,3} | 1->2 | (i) | |
| | {3} | 1->3, 2->3 | (iv)+(ii) | |
| {1,2,4} | {1,4} | 2->4 | (vi) | |
| | {2,4} | 1->2 | (i) | |
| | {4} | 1->4, 2->4 | (v)+(vi) | |
| {1,3,4} | {1,4} | 3->4 | (iii) | |
| | {3,4} | 1->3 | (iv) | |
| | {4} | 1->4, 3->4 | (v)+(iii) | |
| {2,3,4} | {2,4} | 3->4 | (iii) | |
| | {3,4} | 2->3 | (ii) | |
| | {4} | 2->4, 3->4 | (vi)+(iii) | |
| {1,2,3,4} | {1,2,4} | 3->4 | (iii) | |
| | {1,3,4} | 2->3 | (ii) | |
| | {2,3,4} | 1->2 | (i) | |
| | {1,4} | 2->4, 3->4 | (vi)+(iii) | |
| | {2,4} | 1->2, 3->4 | (i)+(iii) | |
| | {3,4} | 1->3, 2->3 | (iv)+(ii) | |
| | {4} | 1->4, 2->4, 3->4 | (v)+(vi)+(iii) | |

FIG. 7

| Initial Groups | Merged Groups | Merges | Gain or Saving |
|---|---|---|---|
| {1,2,3} | {1,3} | 2->3 | 2*104-2*24*4=16 |
| | {2,3} | 1->2 | 1*104-1*24*3=32 |
| | {3} | 1->3, 2->3 | (1*104-3*24*3)+(2*104-2*24*4)=-96 |

FIG. 8

METHODS AND SYSTEMS FOR FAST POWER CONTROL(FPC) MESSAGE BROADCASTING IN WIMAX SYSTEMS

TECHNICAL FIELD

Certain embodiments of the present disclosure generally relate to wireless communication and, more particularly, to efficiently broadcasting a fast power control message in a Worldwide Interoperability for Microwave Access (WiMAX) system.

SUMMARY

Certain embodiments of the present disclosure provide a method for a wireless communications. The method generally includes receiving Carrier to Interference-plus-Noise Ratio (CINR) values from multiple mobile stations, determining a power adjustment value for each mobile station based on the CINR values, grouping the mobile stations based at least on the CINR values, and transmitting a fast power control message for each group with a different number of repetitions.

Certain embodiments of the present disclosure provide an apparatus for a wireless communications. The apparatus generally includes logic for receiving Carrier to Interference-plus-Noise Ratio (CINR) values from multiple mobile stations, logic for determining a power adjustment value for each mobile station based on the CINR values, logic for grouping the mobile stations based at least on the CINR values, and logic for transmitting a fast power control message for each group with a different number of repetitions.

Certain embodiments of the present disclosure provide an apparatus for a wireless communications. The apparatus generally includes means for receiving Carrier to Interference-plus-Noise Ratio (CINR) values from multiple mobile stations, means for determining a power adjustment value for each mobile station based on the CINR values, means for grouping the mobile stations based at least on the CINR values, and means for transmitting a fast power control message for each group with a different number of repetitions.

Certain embodiments of the present disclosure provide a computer-program product for a wireless communications, comprising a computer-readable medium having instructions stored thereon, the instructions being executable by one or more processors. The instructions generally include instructions for receiving Carrier to interference-plus-Noise Ratio (CINR) values from multiple mobile stations, instructions for determining a power adjustment value for each mobile station based on the CINR values, instructions for grouping the mobile stations based at least on the CINR values, and instructions for transmitting a fast power control message for each group with a different number of repetitions.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

A base station (BS) utilizing Worldwide Interoperability for Microwave Access (WiMAX) technology broadcasts a Fast Power Control (FPC) message to mobile stations (MS) to provide closed-loop power control. The FPC message may be utilized by mobile stations that are transporting user data through transport connection. The power control message may be employed to adjust uplink transmission of Channel Quality Indicator Channel (CQICH), Hybrid Automatic Repeat Request Acknowledgement (HARQ ACK) or periodic ranging codes.

A BS may choose a modulation coding scheme to transmit a FPC message, for example Quadrature Phase Shift Keying (QPSK) with Rate=½. In addition, BS may repeat the FPC message several times to increase the probability of correct reception of the message by mobile stations. However, transmitting FPC messages incurs overhead, especially when the FPC message is repeated several times.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
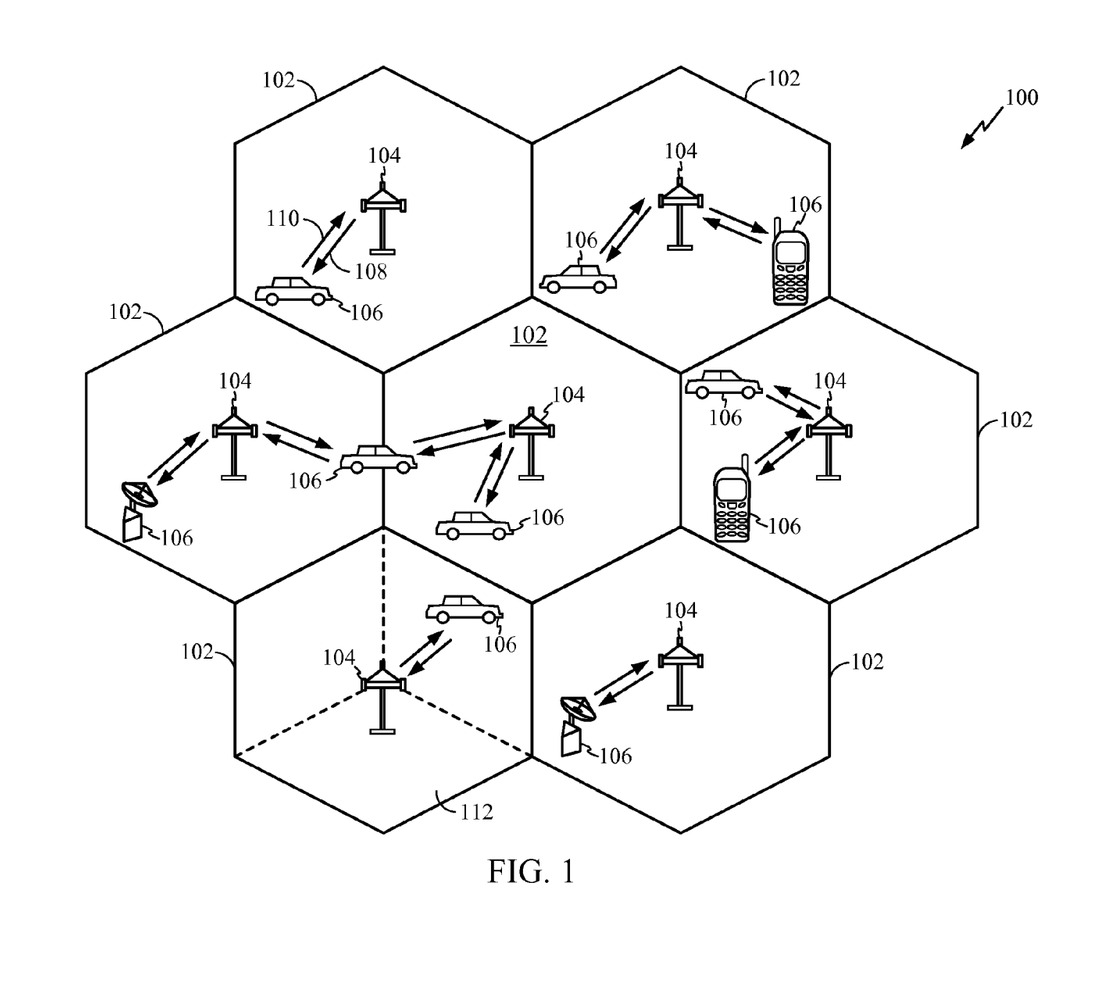
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
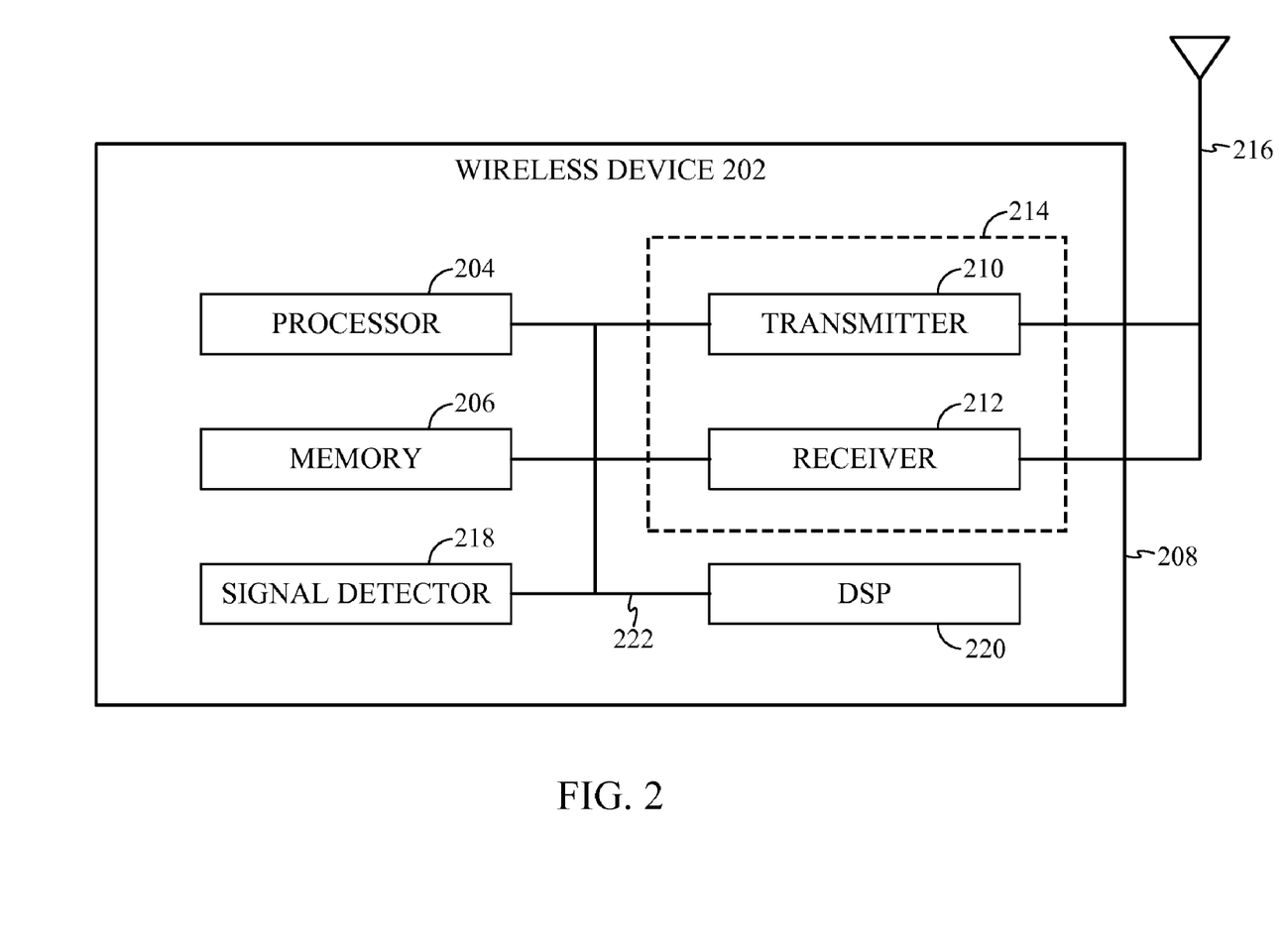
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per subcarrier per sumbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
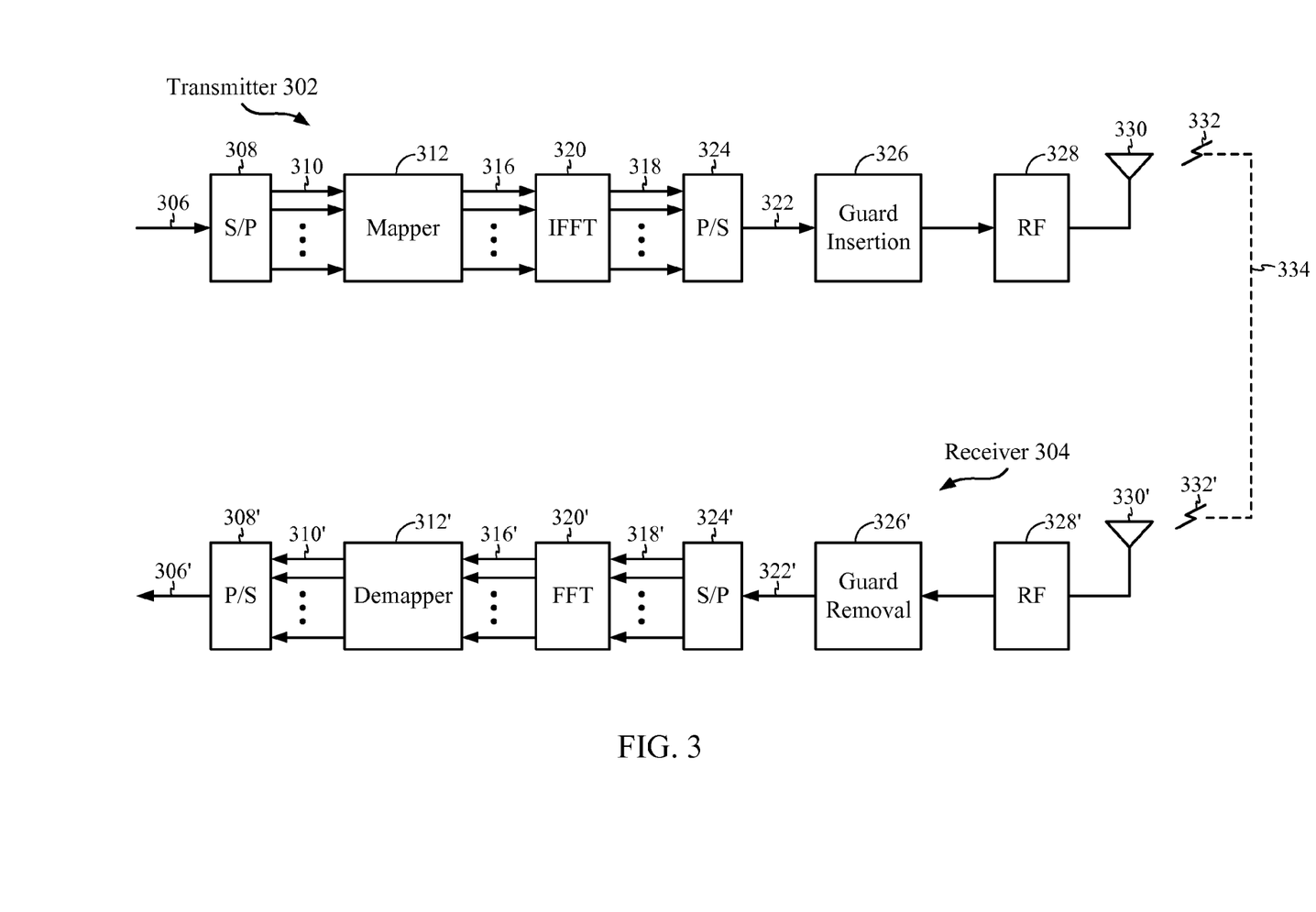
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary Fast Power Control (FPC) Messages Broadcasting in WiMAX Systems

A base station (BS) utilizing Worldwide Interoperability for Microwave Access (WiMAX) technology broadcasts Fast Power Control (FPC) messages to mobile stations (MS) to provide closed-loop power control. The FPC message may be employed by mobile stations that are transporting user traffic through Transport Connection. The power control message may be used to adjust uplink transmission of Channel Quality Indicator Channel (CQICH), Hybrid Automatic Repeat Request Acknowledgement (HARQ ACK) or periodic ranging codes.

A BS may choose a modulation coding scheme to transmit an FPC message, for example, Quadrature Phase Shift Keying (QPSK) with Rate=½. In addition, BS may transmit an FPC message to mobile stations a few times to increase the probability of correct reception of the FPC message by mobile stations.

However, transmitting FPC messages incurs overhead, especially when the FPC message is transmitted more than once. Therefore, optimization may be necessary to minimize the overhead. The present disclosure, presents a method to increase the efficiency of transmitting FPC messages by choosing a proper repetition for the FPC message transmission.

In order to improve the efficiency, a BS may receive a Carrier to Interference plus Noise Ratio (CINR) value from a MS possibly through the fast feedback channel. For certain embodiments of the present disclosure, the BS may use the received CINR value to decide a proper number of repetitions for FPC transmission.

Figure 4:
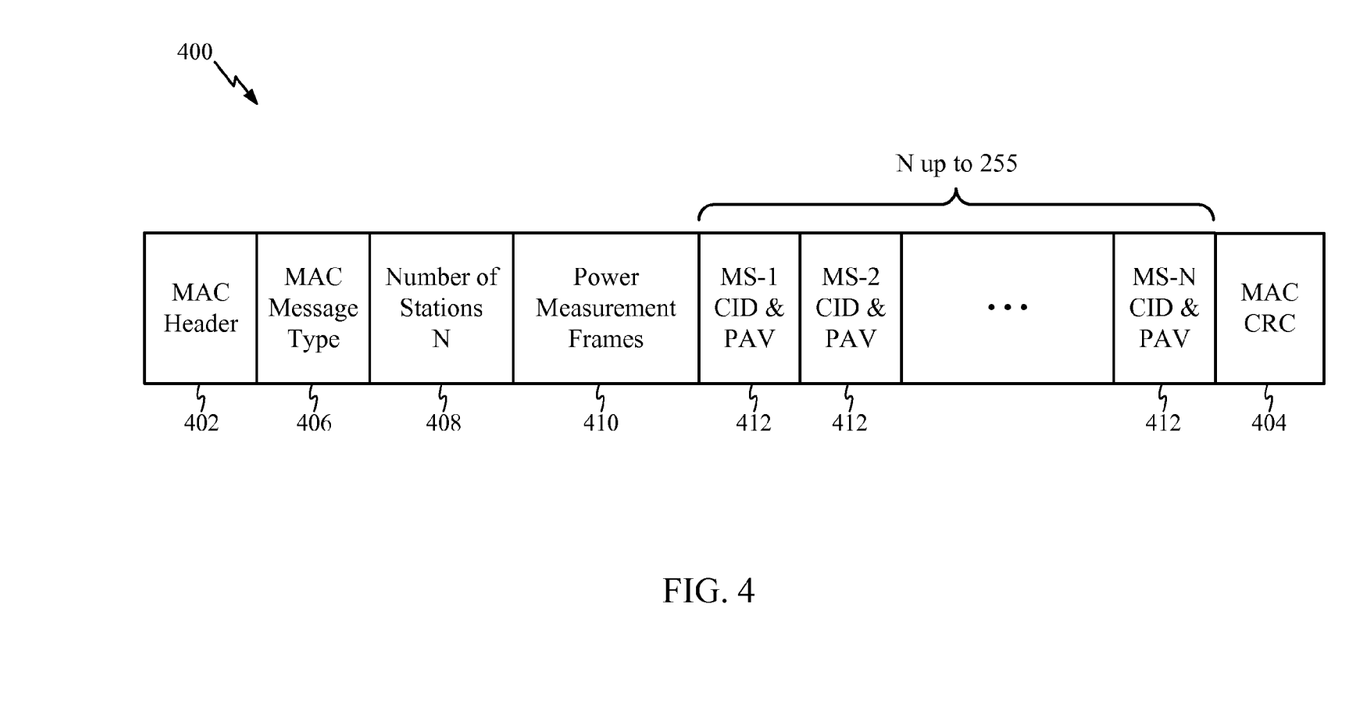
FIG. 4 illustrates an example frame structure of a Fast Power Control (FPC) message.

FIG. 4 illustrates an example structure of a Fast Power Control (FPC) message in WiMAX standard. The FPC message may contain a medium access control (MAC) header 402, a MAC cyclic redundancy check (CRC) 404 code to verify correct reception of the packet, a MAC message type 406, number of mobile stations 408 that are serviced with the FPC message, power measurement frames 410, basic connection identifier (CID) and power adjustment values 412 for up to 255 mobile stations. As illustrated in the figure, a considerable portion of an FPC message may be the header and general information messages that may be viewed as overhead.

A base station may send an FPC message very conservatively (i.e., with the largest number of repetitions allowed in the standard) in order to make sure that all of the mobile stations receive the message and are able to decode the sections addressed to them. The mobile stations that are close to the base station may have a good communication channel. Therefore, smaller repetitions of FPC message may be enough. The mobile stations that are far from the base station may need to receive multiple repetitions of the FPC message before they can successfully decode the FPC message. The present disclosure provides a method for grouping mobile stations based on the CINR values of their channels and transmitting a separate FPC message for each group with possibly smaller number of repetitions to save overhead.

Figure 5:
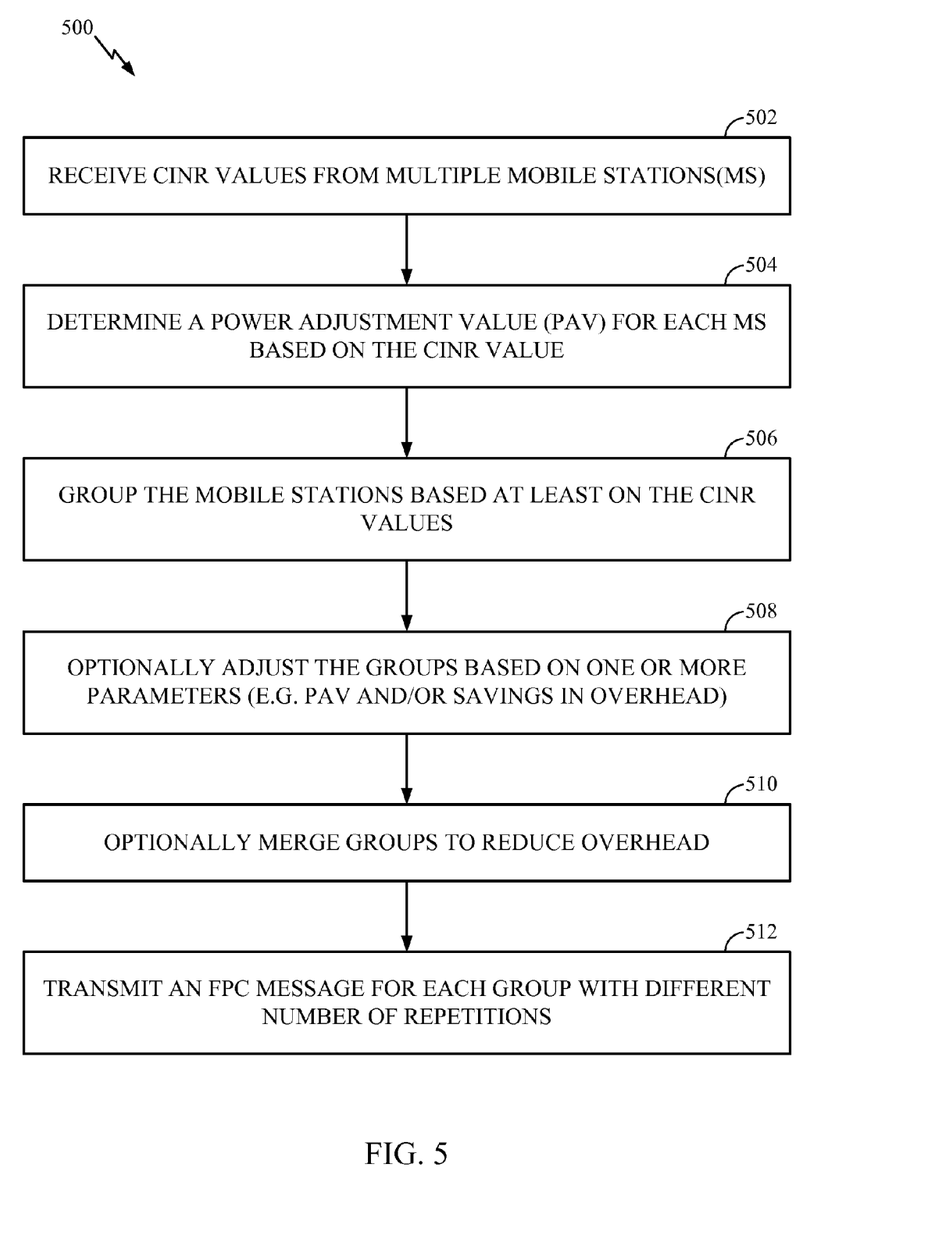
FIG. 5 illustrates example operations for efficiently broadcasting fast power control messages in accordance with certain embodiments of the present disclosure.

FIG. 5 illustrates example operations for efficiently broadcasting a fast power control (FPC) message in accordance with certain embodiments of the present disclosure. At 502, a base station may receive CINR values from multiple mobile stations. At 504, the base station may determine a power adjustment value for each mobile station based on the received CINR values. At 506, the base station may group the mobile stations based at least on their CINR values. At 508, the base station may adjust the groups based on either power adjustment value of each MS or savings in transmission overhead. At 510, the BS may merge some of the groups to reduce the overhead. At 512, the base station may transmit an FPC message for each group of mobile stations with a different number of repetitions. The base station may use fewer repetitions for the group of mobile stations that are close to the base station and enjoy a strong communication channel. The base station may utilize the largest allowed number of repetitions for the mobile stations that are either far from the base station or experience a weak communication channel.

For certain embodiments of the present disclosure, a BS may send a maximum of four FPC messages, each of which may address a disjoint group of mobile station Si, i=1,2,3,4.

Figure 6:
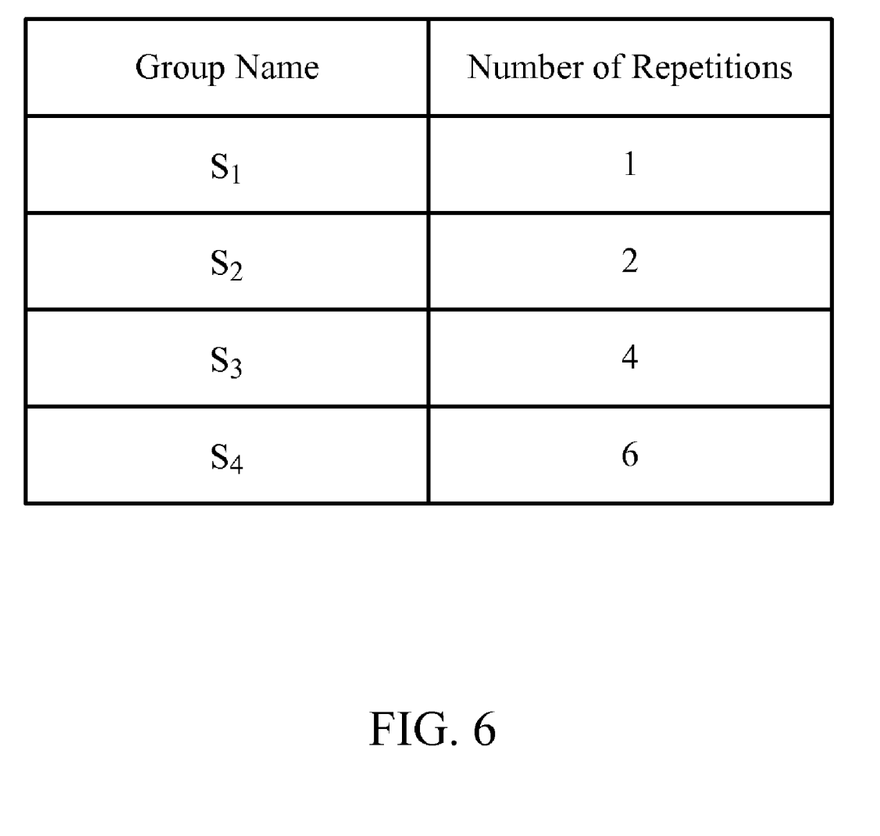
FIG. 6 illustrates example number of repetitions for each group of mobile stations in accordance with certain embodiments of the present disclosure.

Each FPC message may have its own repetitions according to the table illustrated in FIG. 6. S1 may refer to a group of mobile stations who may be close to the base station that receive the FPC message correctly with no repetitions (i.e., number of repetitions is one). S2, S3 and S4 may refer to groups of mobile stations requiring two, four and six repetitions of FPC messages, respectively. ri is the number of repetitions for the group of mobile station Si.

Each FPC message may contain a bits of common overhead. Power adjustment value for each mobile station may result an additional b bits of bandwidth overhead. The common overhead is usually larger than the bandwidth overhead of each mobile station. Therefore, the number of FPC messages should be chosen carefully to avoid an increase in the overall overhead of the system.

For certain embodiments of the present disclosure, a base station may use CINR values to form disjoint groups of mobile stations. The group number i for each mobile station may be determined by following rules:

$$i = \begin{cases} 1 & \text{if } CINR \geq T1, \\ 2 & \text{if } T1 > CINR \geq T2, \\ 3 & \text{if } T2 > CINR \geq T3 \\ 4 & \text{if } T3 > CINR \text{ or } CINR \text{ unknown} \end{cases}$$

For certain embodiments of the present disclosure, a base station may upgrade a mobile station from a group with fewer repetitions to a group with more repetitions if the power adjustment value of the MS is large. For example, if a mobile station belongs to group Si based on its CINR, it may be upgraded to group Sj based on its absolute power adjustment value (P). The new group number j may be selected as follows:

$$j = \begin{cases} \min\{4, i+1\} & \text{if } P2 > P \geq P1 \\ \min\{2, i+2\} & \text{if } P3 > P \geq P2 \\ \min\{4, i+3\} & \text{if } P \geq P3 \end{cases}$$

For another embodiment of the present disclosure, a base station may upgrade a mobile station to a group with more repetitions by choosing the maximum of the two group numbers based either on the CINR or on the absolute power adjustment values. Therefore, if MS belongs to group Si based on its CINR value and belongs to group Sk based on its absolute power adjustment value, then the final group Sj may be selected with the following equation:

$$j = \max\{i, k\}$$

in which the group number k may be selected as follows:

$$k = \begin{cases} 1 & \text{if } P1 > P, \\ 2 & \text{if } P2 > P \geq P1, \\ 3 & \text{if } P3 > P \geq P2, \\ 4 & \text{if } P \geq P3. \end{cases}$$

For certain embodiments of the present disclosure, when a mobile station is in group Si with repetition ri, the mobile station may be upgraded to a group Sj with more FPC message repetitions (rj, i<j). However, a mobile station in group Sj that can use minimum repetition rj may not be downgraded to a group with fewer repetitions (ri, j>i) of FPC messages.

For certain embodiments of the present disclosure, total messaging overhead may be reduced by upgrading mobile stations in group Si to group Sj and letting them use a FPC with more repetitions rj along with mobile stations in group Sj. However, all of the mobile stations in group Si must be upgraded to group Sj to save the common overhead of the FPC message for group Si. Even if one MS remains in group Si, the overhead may not be reduced because the header information still needs to be transmitted in the FPC message even if the message addresses only one mobile station. It may not be possible to reduce the overall overhead by upgrading some of the mobile stations in a group and keeping the rest of the mobile stations in the same group.

When all of the mobile stations in group Si are upgraded to join the mobile stations in group Sj, the gain G, or saving in overhead, may be calculated by the following equation:

$$G = ri*a - (rj - ri)*b*ni \qquad (1)$$

in which a may represent common message overhead (e.g., MAC header, CRC, etc) in a FPC message and b may represent the overhead of the CID and power adjustment value for each MS. The parameters ri and rj may refer to the repetitions of FPC messages for each group, ni may represent the number of mobile station in group Si. The first term in the above equation may show the gain that results from eliminating the common message overhead, and the second term may show the loss that results from additional message overhead per MS because of more repetitions of the FPC message.

According to Eqn. (1), if G is positive, there is benefit in merging the groups and sending a shared FPC message to all the mobile stations in both groups with more repetitions. If G is zero or negative, the overhead cannot be reduced by merging the groups. Therefore, it is better to send separate FPC messages for each group of mobile stations.

Figure 7:
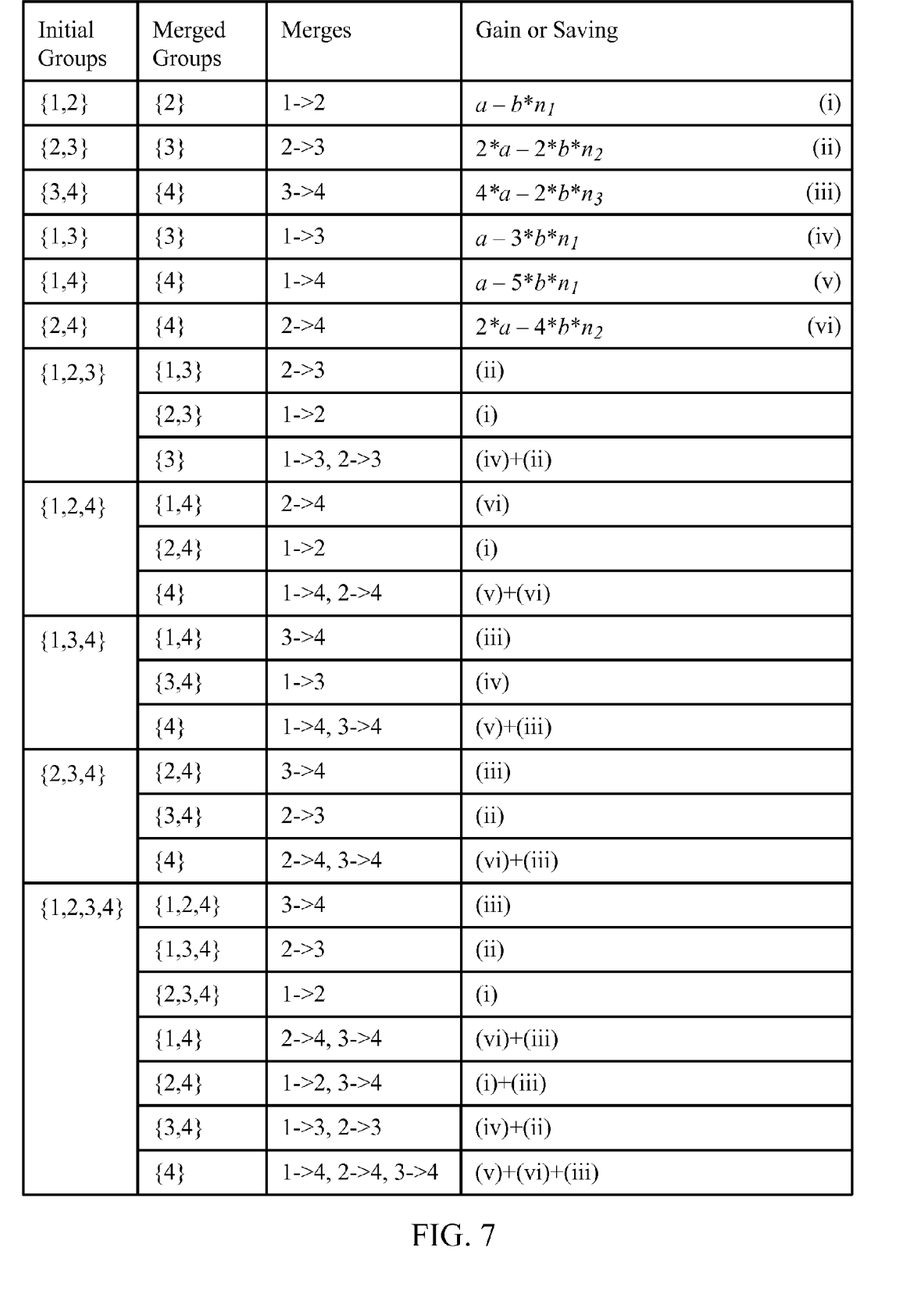
FIG. 7 illustrates an example lookup table containing savings in overhead after merging different groups of mobile stations in accordance with certain embodiments of the present disclosure.

For certain embodiments of the present disclosure, a lookup table as illustrated in FIG. 7 may be used to decide if merging groups decreases the overhead. In this table, the first column may show the initial groups of mobile stations based on their CINR values. For example, if n1=2, n2=1, n3=3, n4=0, then the initial groups may be {1,2,3}. The second column may illustrate the remaining groups after merging. The third column may indicate the groups that are merged. The fourth column may show the gain that results from merging. The algorithm may choose a combination of groups to transmit the FPC messages that result in a higher gain (i.e., a larger positive number).

For certain embodiments of the present disclosure, the number of mobile stations in each group may be as follows: n1=3, n2=4, n3=3, n4=0. The overhead a may be equal to 104 bits (MAC Header=48 bits, MAC CRC=32 bits, MAC Message Type=8 bits, Number of Stations=8 bits, Power measurement frames=8 bits), and b=24 bits (CID=16 bits, power adjustment value=8 bits). Possible choices of groups and the gain from different merging scenarios may be as illustrated in FIG. 8.

Figure 8:
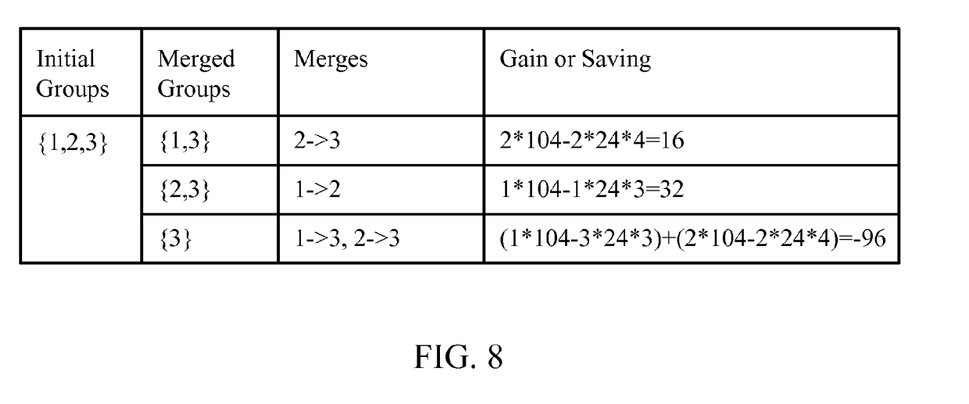
FIG. 8 illustrates example savings in overhead after merging different groups of mobile stations in accordance with certain embodiments of the present disclosure.

According to the table in FIG. 8, the highest gain may be in the case {2,3}. Therefore, the BS should transmit two FPC messages, repeat the first FPC message twice for the mobile stations in groups S1 and S2, and repeat the second FPC message four times for the mobile stations in group S3. The base station needs a total bandwidth resource of 2*104+2*24*(3+4)+4*104+4*24*3=1248 bits for transmitting these two FPC messages. For certain embodiments, if the FPC message was sent to the mobile stations with 6 repetitions, it would require 6*104+6*24*10=2064 bits. The former scenario results in 40% savings in bandwidth compared to the latter case.

As discussed above, certain embodiments of the present disclosure propose methods for transmitting FPC messages efficiently to reduce the overall overhead of the system.

Figure 5A:
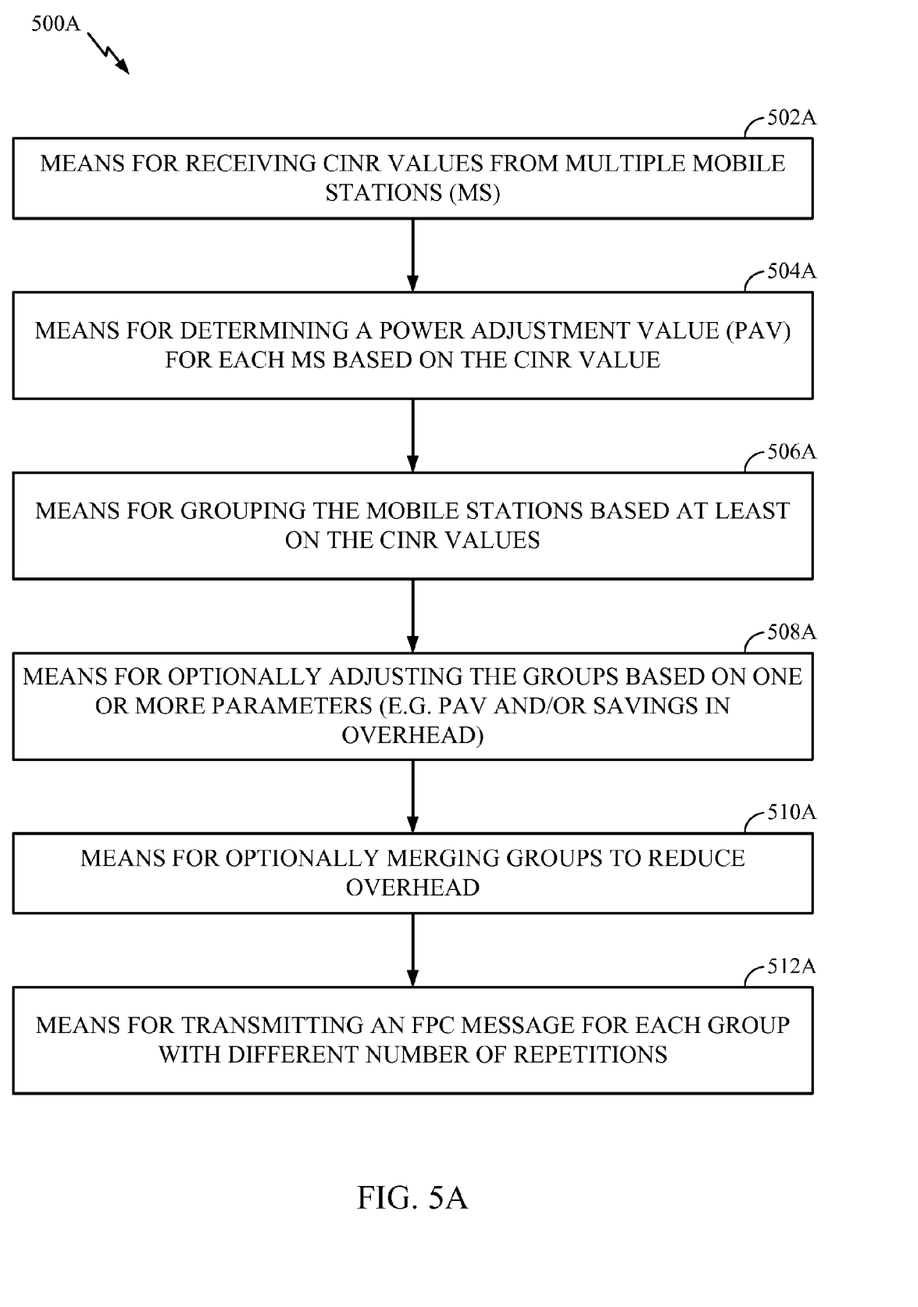
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 502-512 illustrated in FIG. 5 correspond to means-plus-function blocks 502A-512A illustrated in FIG. 5A. More generally, where there are methods illustrated in Figures having corresponding counterpart means-plus-function Figures, the operation blocks correspond to means-plus-function blocks with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
receiving Carrier to Interference-plus-Noise Ratio (CINR) values from multiple mobile stations;
determining a power adjustment value for each mobile station based on the CINR values;
grouping the mobile stations into groups based at least on the CINR values;
adjusting the groups based on one or more parameters by moving at least one of the mobile stations from a first group to a second group; and
transmitting a fast power control message for each group with a different number of repetitions.

2. The method of claim 1, further comprising:
merging at least two of the groups to reduce overhead.

3. The method of claim 1, wherein
the one or more parameters comprise the power adjustment value for each mobile station.

4. The method of claim 1, wherein adjusting the groups comprises:
adjusting the groups to reduce the overall overhead of the system.

5. The method of claim 2, wherein merging at least two of the groups comprises:
reducing the overhead of the system by moving all the mobile stations from the first group to the second group; and
transmitting a common fast power control message for all the mobile stations in the first and the second group.

6. An apparatus for wireless communications, comprising:
logic for receiving Carrier to Interference-plus-Noise Ratio (CINR) values from multiple mobile stations;
logic for determining a power adjustment value for each mobile station based on the CINR values;
logic for grouping the mobile stations into groups based at least on the CINR values;
logic for adjusting the groups based on one or more parameters by moving at least one of the mobile stations from a first group to a second group; and
logic for transmitting a fast power control message for each group with a different number of repetitions.

7. The apparatus of claim 6, further comprising:
logic for merging at least two of the groups to reduce overhead.

8. The apparatus of claim 6, wherein
the one or more parameters comprise the power adjustment value for each mobile station.

9. The apparatus of claim 6, wherein the logic for adjusting the groups comprises:
logic for adjusting the groups to reduce the overall overhead of the system.

10. The apparatus of claim 7, wherein the logic for merging at least two of the groups comprises:
logic for reducing the overhead of the system by moving all the mobile stations from the first group to the second group; and
logic for transmitting a common fast power control message for all the mobile stations in the first and the second group.

11. An apparatus for wireless communications, comprising:
means for receiving Carrier to Interference-plus-Noise Ratio (CINR) values from multiple mobile stations;
means for determining a power adjustment value for each mobile station based on the CINR values;
means for grouping the mobile stations into groups based at least on the CINR values;
means for adjusting the groups based on one or more parameters by moving at least one of the mobile stations from a first group to a second group; and
means for transmitting a fast power control message for each group with a different number of repetitions.

12. The apparatus of claim 11, further comprising:
means for merging at least two of the groups to reduce overhead.

13. The apparatus of claim 11, wherein
the one or more parameters comprise the power adjustment value for each mobile station.

14. The apparatus of claim 11, wherein the means for adjusting the groups comprises:
means for adjusting the groups to reduce the overall overhead of the system.

15. The apparatus of claim 12, wherein the means for merging at least two of the groups comprises:
means for reducing the overhead of the system by moving all the mobile stations from the first group to the second group; and
means for transmitting a common fast power control message for all the mobile stations in the first and the second group.

16. A computer-program product for wireless communications, comprising a non-transitory computer readable medium having instructions stored thereon, the instructions being executable by one or more processors and the instructions comprising:
instructions for receiving Carrier to Interference-plus-Noise Ratio (CINR) values from multiple mobile stations;
instructions for determining a power adjustment value for each mobile station based on the CINR values;
instructions for grouping the mobile stations into groups based at least on the CINR values;
instructions for adjusting the groups based on one or more parameters by moving at least one of the mobile stations from a first group to a second group; and
instructions for transmitting a fast power control message for each group with a different number of repetitions.

17. The computer-program product of claim 16, further comprising:
instructions for merging at least two of the groups to reduce overhead.

18. The computer-program product of claim 16, wherein
the one or more parameters comprise the power adjustment value for each mobile station.

19. The computer-program product of claim 16, wherein the instructions for adjusting the groups comprise:
instructions for adjusting the groups to reduce the overall overhead of the system.

20. The computer-program product of claim 17, wherein the instructions for merging at least two of the groups comprise:
instructions for reducing the overhead of the system by moving all the mobile stations from the first group to the second group; and
instructions for transmitting a common fast power control message for all the mobile stations in the first and the second group.

* * * * *